United States Patent [19]
Maloof

[11] Patent Number: 4,460,188
[45] Date of Patent: Jul. 17, 1984

[54] CART WITH SEAT AND STORAGE COMPARTMENT

[76] Inventor: John J. Maloof, 20 Greenwood St., East Hartford, Conn. 06118

[21] Appl. No.: 368,516

[22] Filed: Apr. 15, 1982

[51] Int. Cl.³ .............................................. B62B 1/12
[52] U.S. Cl. ...................................... 280/30; 280/645; 280/655; 280/43.24; 280/47.26; 280/47.37 R; 297/193
[58] Field of Search ...................... 280/639, 35, 30, 40, 280/43.1, 39, 63, 43.24, 651, 47.18, 652, 47.25, 653, 47.26, 654, 47.21, 47.37 R, 47.41, 655, 47.13 R, 47.23, 643; 297/129, 118, 94, 130, 131, 132, 193

[56] References Cited

U.S. PATENT DOCUMENTS

| | | | |
|---|---|---|---|
| 3,389,818 | 6/1968 | Rinehart | 280/47.26 |
| 3,591,194 | 7/1971 | Vega | 280/47.26 |
| 3,704,025 | 11/1972 | Cerveny | 280/643 |
| 4,059,285 | 11/1977 | McCoy | 280/654 |
| 4,114,914 | 9/1978 | Cohen | 280/651 |
| 4,227,709 | 10/1980 | Gradwohl | 280/47.18 |

FOREIGN PATENT DOCUMENTS

| | | | |
|---|---|---|---|
| 230208 | 1/1971 | Fed. Rep. of Germany | 280/47.25 |
| 304794 | 8/1977 | Fed. Rep. of Germany | 280/47.25 |
| 821909 | 12/1937 | France | 280/47.26 |
| 2029937 | 10/1970 | France | 280/47.26 |
| 67864 | 12/1950 | Netherlands | 280/47.25 |
| 132150 | 7/1951 | Sweden | 280/655 |
| 593863 | 10/1947 | United Kingdom | 280/654 |
| 644069 | 10/1950 | United Kingdom | 297/131 |
| 1550827 | 8/1979 | United Kingdom | 297/193 |

*Primary Examiner*—David M. Mitchell
*Attorney, Agent, or Firm*—Stoll, Wilkie, Previto and Hoffman

[57] ABSTRACT

The invention is a cart which has a hollow base portion for the storage of articles and which also provides a seat. An elongated handle is pivotally mounted on the base with a draw bar at one end and with wheels mounted on the opposite end. The handle has three positions. When it is fully extended it is swung to a cart pulling position which moves the wheels downwardly from the base to provide a wheeled cart with storage. When the handle in its extended position is turned to a second and generally vertical position the wheels are raised and a back rest is provided for the seat. In the third position, the handle folds into sections so that the entire cart assembly occupies a space only slightly larger than the base for being carried in a car trunk or otherwise.

5 Claims, 9 Drawing Figures

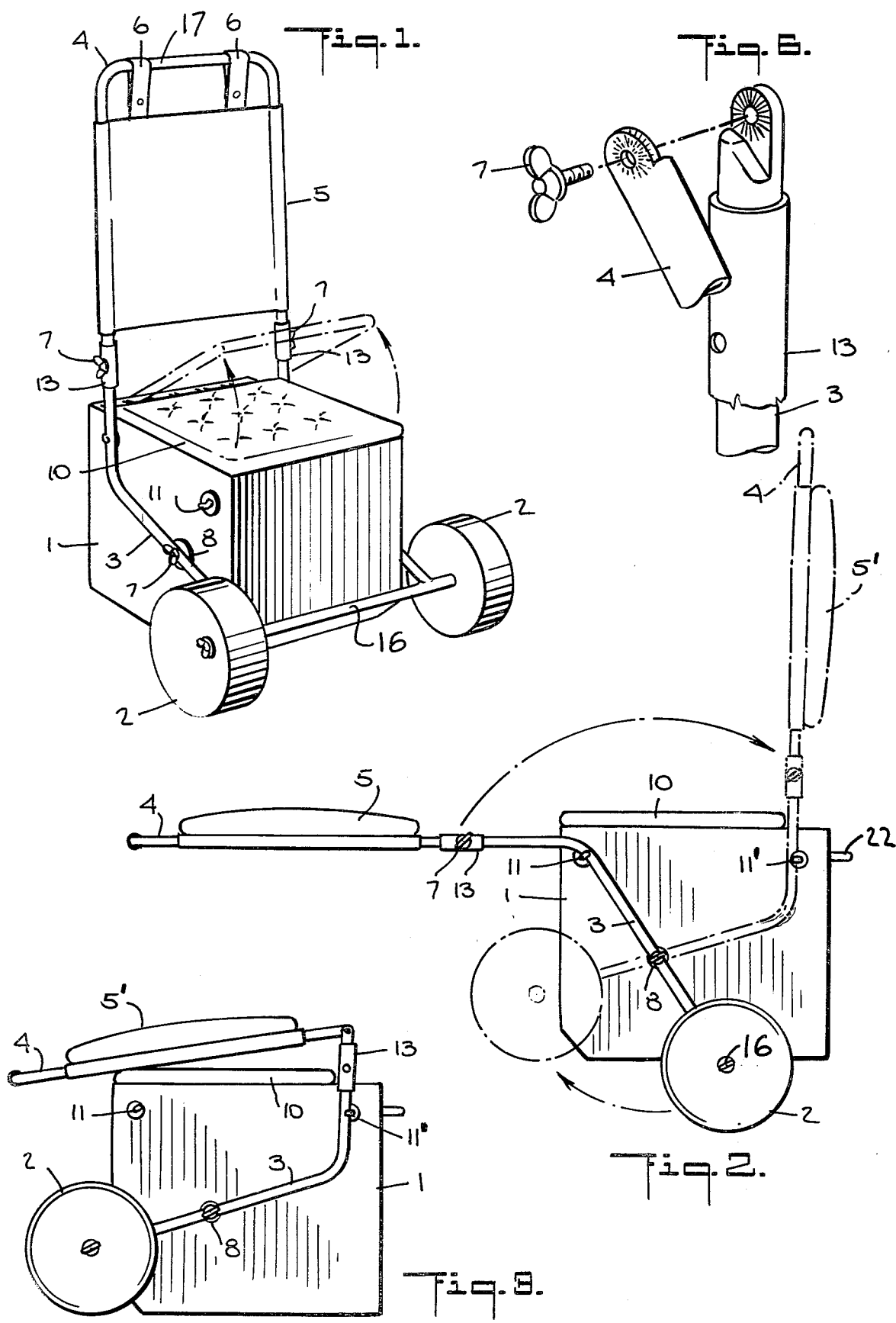

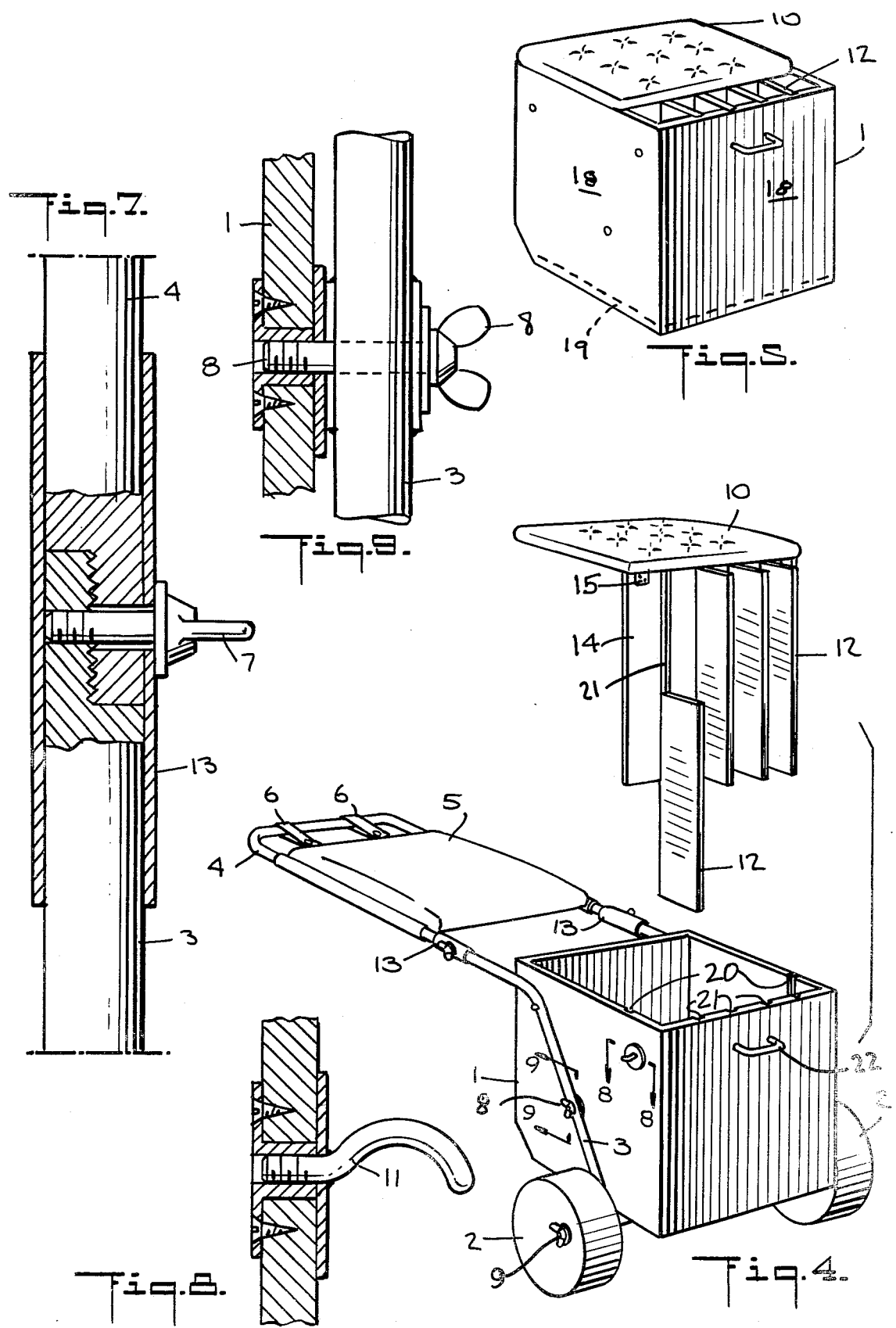

CART WITH SEAT AND STORAGE COMPARTMENT

BACKGROUND OF THE INVENTION

The present invention relates to a multi-purpose cart and more particularly to a multi-purpose cart which provides a comfortable seat in one mode and a cart with storage space in another mode and which also may be folded into a compact mode for transport. The cart is particularly useful for fishing, picnics or other similar uses as it is readily carried in a car trunk or rear compartment and since it has wide wheels for being moved in sandy areas. It also provides a comfortable seat with a back rest. While there are a number of multi-purpose cart-like vehicles, prior vehicles lack the capability for multiple purposes that the present cart has and as they are not adapted for use in parks or beach areas where a commodious carrier is required which is easily moved over the sand and which at the same time provides a comfortable seat useful for surf fishing and the like.

Accordingly, an object of the present invention is to provide improved cart with seat and storage means.

Another object of the present invention is to provide a cart useful in soft or sandy areas and which may be folded for compact storage and otherwise adjusted to provide comfortable seating.

Another object of the present invention is to provide a cart and seat combination which may be folded into a compact form for storage and transportation.

Another object of the present invention is to provide a simple and rugged cart which is sturdy and comfortable both in a cart mode and in a seating mode.

Other and further objects of the present invention will become apparent upon an understanding of the illustrative embodiments about to be described, or will be indicated in the appended claims, and various advantages not referred to herein will occur to one skilled in the art upon employment of the invention in practice.

BRIEF DESCRIPTION OF THE DRAWINGS

A preferred embodiment of the invention has been chosen for purposes of illustration and description and is shown in the accompanying drawings, forming a part of the specification, wherein:

FIG. 1 is a perspective view of the cart set up as a seat.

FIG. 2 is a side elevational view of the cart arranged in its transport position with the wheels lowered.

FIG. 3 is a side elevational view of the cart in its compact transport or storage position.

FIG. 4 is an exploded perspective view illustrating the cart arranged for transport and illustrating the storage compartment and seat details.

FIG. 5 is a perspective view of a preferred embodiment of the cart base.

FIG. 6 is an enlarged detailed perspective view of the handle hinged joint.

FIG. 7 is an enlarged view, partially in section, of the hinged joint of FIG. 6.

FIG. 8 is a horizontal, sectional view of the handle stop taken along line 8—8 on FIG. 4.

FIG. 9 is a vertical, sectional view of the handle pivot taken along line 9—9 on FIG. 4.

DESCRIPTION OF A PREFERRED EMBODIMENT

The combination cart and seat of this invention will now be described in detail with reference to the drawing.

FIGS. 1-3 illustrate the seat mode, the cart mode and the storage mode respectively. The cart has a relatively large and hollow body or base 1 which provides the principal portion of the seat as well as the storage means for the cart. The second principal portion of the cart is the handle which has two lower end portions 3 pivotally attached to the base at 8. An axle 16 connects the lower handle portions 3 for mounting the spaced wheels 2. A preferred embodiment of a wheel 2 is a molded plastic wheel having a substantial width such as several inches so that it will ride easily on sandy or other soft areas. The upper portion 4 of the handle including a connecting draw bar 17 at its top functions alternatively as a seat back as shown in FIG. 1 and as a draw handle for the cart as illustrated in FIG. 2. In order to change the cart from the seat mode to the cart mode it is only necessary to swing the handle 4 from the position illustrated in FIG. 1 about the pivot 8 on the base 1 to the cart position illustrated in FIG. 2. The handle 22 facilitates this operation. This moves the wheels 2 downwardly below the base 1 for contact with the ground and moves the axle 16 into a position adjacent to the base 1. Space limit pins 11 and 11' determine the cart mode and the seat mode respectively for the handle. The handle portion 3 is curved a short distance above the pivot 8 in order to provide the above described relative positions for the seat use and the cart use. As seen in the dash-dot view of the handle 3,4 in FIG. 2, the wheels 2 are raised clear of the ground surface in the seat mode. The transport mode is similar to the seat mode except that the handle 3,4 is folded at about its center portion at a hinge 7 to cause the upper handle portion 4 to lie just above the base seat 10. In this position, the overall cart occupies a space only slightly larger than the base 1 itself.

The handle 3,4 is folded in this manner by using the hinge 7. The handle is hinged at 7 at a position between the upper portion 4 and the lower portion 3 and a removable threaded wing nut 7 removably fastens the hinge in combination with a cylindrical support sleeve 13. When the handle 3,4 is to be folded down, the wing nut 7 is removed as illustrated in FIG. 6 and the support sleeve 13 is slipped clear of the joint. The handle portions 3 and 4 may now be swung to the relative positions desired and the wing nut 7 reinserted using the sleeve 13 for the seat and cart modes and with the sleeve 13 moved clear in the transport position of (FIG. 3). Radial locking teeth are preferably provided in the joint 7 to further lock the handle in the particular position being used.

A plastic or fabric back rest 5 slides over the handle portion 4 and is held at the desired position with snap straps 6. A separate utility pack 5' is removably attached to the back rest 5 by suitable snaps or otherwise.

The preferred embodiment of the base 1 is illustrated in FIGS. 4 and 5. It comprises a hollow box-like form with side walls 18 and a bottom 19 and may be formed from suitable metal or wooden parts or may be formed as a unitary molded element. The seat cushion 10 is formed of suitable foam or other material mounted on a rigid support and is hinged at 15 to a supporting center board 14. The center board 14 is removably received in spaced side slots 20 to permit the base 1 to be used as an open top cart. Where fishing rods or other rod-like implements are to be stored or transported, a series of storage slots are provided as formed by a number of partitions 12. The partitions 12 are removably mounted in spaced slots 21 formed on the center board 14 and on the back wall 18 of the base 1.

One example of a use for the cart is on beaches where it has become increasingly difficult to drive anywhere near to the water's edge in a vehicle. In activities such as surf fishing, for example, it is usually necessary to park some distance from the water's edge. The cart of the invention is easily stored in a car trunk or station wagon and then may be quickly adjusted to form a rugged cart easily drawn over rough ground and soft beaches. In its seat form the cart is transformed to a rugged and comfortable seat for use at the water's edge including adequate storage for the necessary fishing articles etc.

It will be seen that a multi-purpose cart has been described which is useful as a seat and as a cart and which additionally is easily transported in a folded or storage form. The cart is particularly useful in view of its commodious base and in view of its preferred wheel design which is servicable for use on sand or other soft surfaces. The simple and effective transformation from the seat arrangement to the cart arrangement provides a rugged and useful seat cart combination. Finally, the design not only provides the comfortable and practical seat and cart designs, but also provides for the compact storage mold for easy transport.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. A combination cart and seat comprising the combination of:
   a hollow enclosed base;
   a handle pivotally mounted on said base and having top and bottom portions;
   a pair of wheels mounted on the bottom portion of said handle;
   a backrest mounted on the top portion of said handle;
   said handle being arranged to swing from a cart position with its upper portion being generally horizontal and with the wheels being positioned below the base and resting on the ground to a seat backrest position with the upper handle portion being generally vertical and with the wheels being positioned above the bottom of said base;
   hinge means connecting said upper and lower handle portions whereby said upper handle portion is foldable over the top of said base in a cart and seat storage position;
   said wheels being relatively wide as compared to their diameter for supporting said cart and seat on soft surfaces; and
   said base comprising a top seat means and a hollow storage compartment with the top seat means being hinged for access to the storage compartment.

2. The combination as claimed in claim 1 in which said top is fully removable from the remainder of said base.

3. The combination as claimed in claim 1 in which said upper handle portion comprises a flexible back rest.

4. The combination as claimed in claim 3 in which said back rest comprises a hollow flexible utility bag.

5. The combination as claimed in claim 1 which comprises spaced limit means on said base for determining the handle positions.

* * * * *